(12) United States Patent
Xie

(10) Patent No.: US 11,206,240 B2
(45) Date of Patent: Dec. 21, 2021

(54) METHOD AND APPARATUS FOR PROCESSING DATA

(71) Applicant: Wangsu Science & Technology Co., Ltd., Shanghai (CN)

(72) Inventor: Wenwei Xie, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/898,210

(22) Filed: Jun. 10, 2020

(65) Prior Publication Data

US 2020/0304457 A1    Sep. 24, 2020

Related U.S. Application Data

(63) Continuation of application No. PCT/CN2020/074961, filed on Feb. 12, 2020.

(30) Foreign Application Priority Data

Feb. 20, 2019  (CN) .......................... 201910126092.0

(51) Int. Cl.
*H04L 29/12* (2006.01)
*H04L 29/06* (2006.01)
(Continued)

(52) U.S. Cl.
CPC ............ *H04L 61/25* (2013.01); *H04L 45/566* (2013.01); *H04L 45/745* (2013.01); *H04L 61/10* (2013.01); *H04L 61/1552* (2013.01); *H04L 69/22* (2013.01)

(58) Field of Classification Search
CPC ......... H04L 61/25; H04L 61/10; H04L 69/22; H04L 45/566; H04L 45/745; H04L 61/1552; H04L 61/256
See application file for complete search history.

(56) References Cited

U.S. PATENT DOCUMENTS 8,959,611 B1 *  2/2015  Vincent ................... H04L 67/10
                                                                726/13
2007/0153782 A1 *  7/2007  Fletcher .............. H04L 61/2567
                                                                370/389
(Continued)

FOREIGN PATENT DOCUMENTS

| CN | 102045260 A | 5/2011 |
| CN | 104301445 A | 1/2015 |
| CN | 105337808 A | 2/2016 |

(Continued)

OTHER PUBLICATIONS

Wangsu Science & Technology, Chinese Search Report, CN 201910126092.0, dated Sep. 3, 2020, 7 pgs.

(Continued)

*Primary Examiner* — Yaotang Wang
(74) *Attorney, Agent, or Firm* — Usch Law, PC

(57) ABSTRACT

Certain embodiments of the present disclosure provide a method and apparatus for processing data. The method comprises, at an edge device, parsing a first data packet after receiving the first data packet sent by a client device to obtain a virtual IP address and a destination port that correspond to the first data packet; querying an IP address mapping table according to the virtual IP address to obtain a destination IP address corresponding to the virtual IP address; and sending the first data packet according to the destination IP address and the destination port.

16 Claims, 6 Drawing Sheets

(51) Int. Cl.
*H04L 12/721* (2013.01)
*H04L 12/741* (2013.01)

(56) References Cited

U.S. PATENT DOCUMENTS

| | | | |
|---|---|---|---|
| 2011/0252469 | A1 | 10/2011 | Cho et al. |
| 2014/0337500 | A1* | 11/2014 | Lee ................... H04L 67/10 709/223 |

FOREIGN PATENT DOCUMENTS

| | | | |
|---|---|---|---|
| CN | 105791173 | A | 7/2016 |
| CN | 106411742 | A | 2/2017 |
| CN | 106470191 | A | 3/2017 |
| CN | 109905387 | A | 6/2019 |
| EP | 3316558 | A1 | 5/2018 |
| EP | 3379807 | A1 | 9/2018 |

OTHER PUBLICATIONS

Wangsu Science & Technology Co., Ltd., Third Office Action (CN), CN201910126092.0, dated Feb. 3, 2021, 8 pgs.
Wangsu Science & Technology Co., Ltd., Extended European Search Report, EP20728378.9, dated Mar. 11, 2021, 14 pgs.
Lee et al., "An Embedded Router for Internet Communication Among Private Networks," *Industrial Technology* (2006), Dec. 1, 2006. 5 pgs. (pp. 687-691).
Lee et al.. "An Expanded NAT with Server Connection Ability," *TENCON* 99, Proceedings of the IEEE Region 10 Conference, Cheju Island, South Korea, Sep. 15-17, 1999, vol. 2, 4 pgs. (pp. 1391-1394).
Lucent Technologies, "IP Network Address Translator (NAT) Terminology and Considerations," Aug. 1, 1999, 31 pgs.
Wangsu Science and Technology, International Search Report, PCT/CN2020/074961, dated Apr. 24, 2020, 4 pgs.

* cited by examiner

METHOD AND APPARATUS FOR PROCESSING DATA

CROSS REFERENCE TO RELATED APPLICATIONS

The present disclosure is a continuation of PCT Application No. PCT/CN2020/074961, entitled "METHOD AND APPARATUS FOR PROCESSING DATA", filed Feb. 12, 2020, which claims priority to Chinese patent application No. 201910126092.0, entitled "METHOD AND APPARATUS FOR PROCESSING DATA", filed Feb. 20, 2019, each of which is incorporated by reference herein in its entirety.

TECHNICAL FIELD

The present disclosure relates to data processing technology and in particular to a method and apparatus for processing data.

BACKGROUND

In order to relieve pressure on an origin station in a process of transmitting data information, in general, an edge device may be arranged between a client device and the origin station. The edge device, in a process of scheduling the data information, may receive the data information sent by the client device, process the data information (such as acceleration processing, filtering processing, compression processing, and the like), and send the processed data information to a target origin station. A domain name system (DNS) is a common application scenario for scheduling the data information. Specifically, the edge device, after obtaining domain name information of the target origin station, may determine an IP address and a destination port of the target origin station according to the domain name information of the target origin station, so that the processed data information can be sent to the target origin station. If it is determined that either information of the obtained IP address and the destination port of the target origin station is incorrect, the data information from the client device may not be successfully forwarded to the target origin station, thus causing a poor user experience.

In order to determine the IP address and the destination port of the target origin station, the following method is generally adopted in existing technology. For example, the information of the origin station (such as the number of the origin station, the IP address of the origin station, the port of the origin station, and the like) connected with the edge device may be manually obtained in advance, and then virtual IP address and port which correspond to the information of the origin station on the edge device may be set up. Thus, the edge device may determine the IP address and the destination port of the target origin station through the virtual IP address and port at which the data information sent by the client device arrives. However, since the virtual IP address and port are set according to the manually obtained information of the origin station, it is necessary to manually re-obtain changed information of the origin station and re-set the virtual IP address and port if the information of the origin station changes, which makes the operation complicated. Moreover, the destination port in the data information sent by the client device may be determined through real-time negotiation. When scheduling the data information through a preset port, the preset port may not include the destination port, thus causing a scheduling error. Therefore, the method adopted in the existing technology may lead to lack of flexibility of scheduling the data information.

Therefore, a need exists for a method and apparatus for processing data to improve the flexibility of scheduling the data information.

SUMMARY

An embodiment of the present disclosure provides a method and apparatus for processing data to improve flexibility of scheduling data information.

A method for processing data provided in an embodiment of the present disclosure includes: parsing, by an edge device, a first data packet after determining that the first data packet sent by a client device is received, to obtain a virtual IP address corresponding to the first data packet; querying, by the edge device, an IP address mapping table according to the virtual IP address to obtain a destination IP address corresponding to the virtual IP address; and sending, by the edge device, the first data packet according to the destination IP address.

In the embodiment of the present disclosure, the edge device may be provided with the IP address mapping table. By querying the IP address mapping table to obtain the destination IP address, there is no need for the edge device to synchronize information of an origin station with the client device, thus making the process of determining the destination IP address more flexible, and further improving the flexibility of scheduling the data information.

In one embodiment, the IP address mapping table may be determined by: receiving, by the edge device, IP addresses of a plurality of origin stations sent by the plurality of origin stations, and generating, by the edge device, a plurality of virtual IP addresses in one-to-one correspondence with the IP addresses of the plurality of origin stations according to the IP addresses of the plurality of origin stations; and generating, by the edge device, the IP address mapping table according to the IP addresses of the plurality of origin stations and the plurality of virtual IP addresses.

In the embodiment of the present disclosure, the edge device may automatically generate the plurality of virtual IP addresses and the IP address mapping table according to the IP addresses of the plurality of origin stations, without manually setting the plurality of virtual IP addresses and the IP address mapping table, thereby reducing labor costs and facilitating implementation. Moreover, by using the origin station to send the IP address of the origin station to the edge device, the IP address mapping table may be updated by the edge device in real time. For example, if the edge device receives a new IP address of the origin station sent by the origin station, the edge device may be updated with the new IP address of the origin station. That is, compared with a method for determining the IP address mapping table in the existing technology, the IP address mapping table determined in the embodiment of the present disclosure may have a better real-time performance and better conform with actual requirements.

In one embodiment, the IP address mapping table may be determined in the following manner: receiving, by the edge device, information sent by a plurality of back-to-origin devices, where the information sent by each of the back-to-origin devices includes an IP address of each of the back-to-origin devices and the IP address of an origin station corresponding to each of the back-to-origin devices; generating, by the edge device, a plurality of virtual IP addresses in one-to-one correspondence with IP addresses of origin stations corresponding to the plurality of back-to-origin devices according to the IP addresses of the origin stations corresponding to the plurality of back-to-origin devices; and generating, by the edge device, the IP address mapping table according to the IP addresses of the plurality of back-to-origin devices, the IP addresses of the origin stations corresponding to the plurality of back-to-origin devices, and the plurality of virtual IP addresses.

In the embodiment of the present disclosure, the plurality of back-to-origin devices are set in one-to-one correspondence with the plurality of origin stations, so that the client device may obtain the required resources by accessing the back-to-origin devices corresponding to the origin stations, thus avoiding a technical problem of high origin station pressure caused by a plurality of client devices accessing the origin station simultaneously. Moreover, the edge device may establish the IP address mapping table according to the IP address of the origin station sent by the back-to-origin device, thereby saving labor costs and improving flexibility of scheduling the data information.

In one embodiment, before the edge device receives the first data packet sent by the client device, the method may further include: receiving, by the edge device, a request message sent by the client device, where the request message includes domain name information of a target origin station included; and querying, by the edge device, the IP address mapping table according to the domain name information of the target origin station to obtain the virtual IP address corresponding to the domain name information, and sending, by the edge device, the virtual IP address to the client device.

Here, the first data packet sent by the client device may include the virtual IP address corresponding to the IP address of the target origin station, and the virtual IP address corresponding to the IP address of the target origin station may be obtained by the client device in advance from the edge device. That is, in the embodiment of the present disclosure, the client device is communicated with the edge device to obtain the virtual IP address corresponding to the IP address of the target origin station. Compared with a method for manually determining the virtual IP address corresponding to the IP address of the target origin station in the existing technology, the edge device may not need to synchronize a corresponding relationship between the IP addresses of the plurality of origin stations and the plurality of virtual IP addresses to the client device, and may determine the virtual IP address corresponding to the IP address of the target origin station without manual interaction, thus improving the flexibility of data processing and improving user experience.

In one embodiment, the IP address mapping table may be determined by: receiving, by the edge device, the domain name information of a plurality of origin stations and IP addresses of the plurality of origin stations sent by the plurality of origin stations, and generating, by the edge device, a plurality of virtual IP addresses in one-to-one correspondence with the IP addresses of the plurality of origin stations according to the IP addresses of the plurality of origin stations; and generating, by the edge device, the IP address mapping table according to the domain name information of the plurality of origin stations, the IP addresses of the plurality of origin stations, and the plurality of virtual IP addresses. In the embodiment of the present disclosure, the IP address mapping table may store a mapping relationship between the domain name information of the plurality of origin stations, the IP addresses of the plurality of origin stations and the plurality of virtual IP addresses, so that the edge device may obtain the IP address of the target origin station according to the domain name information of the target origin station without manually determining the corresponding relationship between the domain name information of the target origin station and the IP address of the target origin station, and the operation is simple and easy to implement.

In one embodiment, the IP address mapping table may be determined in the following manner: receiving, by the edge device, information sent by a plurality of back-to-origin devices, where the information sent by each of the back-to-origin devices includes an IP address of each of the back-to-origin devices, the domain name information of an origin station corresponding to each of the back-to-origin devices and the IP address of the origin station corresponding to each of the back-to-origin devices; generating, by the edge device, the plurality of virtual IP addresses in one-to-one correspondence with the IP addresses of the origin stations corresponding to the plurality of back-to-origin devices according to the IP addresses of the origin stations corresponding to the plurality of back-to-origin devices; and generating, by the edge device, the IP address mapping table according to the IP addresses of the plurality of back-to-origin devices, the domain name information of the origin stations corresponding to the plurality of back-to-origin devices, the IP addresses of the origin stations corresponding to the plurality of back-to-origin devices, and the plurality of virtual IP addresses.

In one embodiment, the edge device parses the first data packet to obtain data information corresponding to the first data packet in addition to the virtual IP address corresponding to the first data packet; where before sending, by the edge device, the first data packet according to the destination IP address, the method may further include: processing, by the edge device, the data information corresponding to the first data packet to obtain processed data information; and obtaining, by the edge device, a processed first data packet according to the processed data information and the destination IP address; and sending, by the edge device, the first data packet according to the destination IP address may include: sending, by the edge device, the processed first data packet according to the destination IP address. In the embodiment of the present disclosure, by processing (such as compression, encryption, etc.) the data information corresponding to the first data packet and sending the processed data information in the process of scheduling the data information, the speed of data transmission may be enhanced, the flexibility of scheduling the data information may be improved, requirements of users may be met, and the user experience may be improved.

A method for processing data provided in an embodiment of the present disclosure includes: parsing, by an edge device, a first data packet after determining that the first data packet sent by a client device is received, to obtain a destination port corresponding to the first data packet; and sending, by the edge device, the first data packet according to the destination port.

In the embodiment of the present disclosure, the destination port is obtained by using the edge device to parse the first data packet, where the destination port obtained by parsing the first data packet is the destination port of the origin station. Compared with a method for statically specifying the destination port in the existing technology, there is no need to set the destination port on the edge device in the embodiment of the present disclosure, thus supporting a protocol in which a port needs dynamical negotiation and improving the flexibility of scheduling the data information.

In one embodiment, the edge device parses the first data packet to obtain data information corresponding to the first data packet in addition to the destination port corresponding to the first data packet. Accordingly, sending, by the edge device, the first data packet according to the destination port after obtaining the destination port corresponding to the first data packet may include: delivering, by the edge device, the data information to a first port, where the first port is a port determined in advance from one or more ports and configured to receive the data information; and obtaining, by the edge device, the destination port corresponding to the first data packet after determining that the data information reaches the first port, and sending, by the edge device, the first data packet according to the data information corresponding to the first data packet and the destination port.

In one embodiment, sending, by the edge device, the first data packet according to the data information corresponding to the first data packet and the destination port may include: processing, by the edge device, the data information corresponding to the first data packet to obtain processed data information; and obtaining, by the edge device, a second data packet according to the processed data information and the destination port, and sending, by the edge device, the second data packet.

An edge device provided in an embodiment of the present disclosure includes:

a processing module, configured to parse a first data packet after determining that the first data packet sent by a client device is received, to obtain a virtual IP address corresponding to the first data packet, and query an IP address mapping table according to the virtual IP address to obtain a destination IP address corresponding to the virtual IP address; and a transceiver module, configured to send the first data packet according to the destination IP address.

In one embodiment, the IP address mapping table is determined by:

receiving IP addresses of a plurality of origin stations sent by the plurality of origin stations, and generating a plurality of virtual IP addresses in one-to-one correspondence with the IP addresses of the plurality of origin stations according to the IP addresses of the plurality of origin stations; and generating the IP address mapping table according to the IP addresses of the plurality of origin stations and the plurality of virtual IP addresses.

In one embodiment, the IP address mapping table is determined by:

receiving information sent by a plurality of back-to-origin devices, wherein the information sent by each of the back-to-origin devices includes an IP address of each of the back-to-origin devices and the IP address of an origin station corresponding to each of the back-to-origin devices;

generating a plurality of virtual IP addresses in one-to-one correspondence with IP addresses of origin stations corresponding to the plurality of back-to-origin devices according to the IP addresses of the origin stations corresponding to the plurality of back-to-origin devices; and generating the IP address mapping table according to the IP addresses of the plurality of back-to-origin devices, the IP addresses of the origin stations corresponding to the plurality of back-to-origin devices, and the plurality of virtual IP addresses.

In one embodiment, the processing module is further configured to:

receive a request message sent by the client device, wherein the request message includes domain name information of a target origin station; and query the IP address mapping table according to the domain name information of the target origin station to obtain the virtual IP address corresponding to the domain name information, and send the virtual IP address to the client device.

In one embodiment, the IP address mapping table is determined by:

receiving the domain name information of a plurality of origin stations and IP addresses of the plurality of origin stations sent by the plurality of origin stations, and generating a plurality of virtual IP addresses in one-to-one correspondence with the IP addresses of the plurality of origin stations according to the IP addresses of the plurality of origin stations; and generating the IP address mapping table according to the domain name information of the plurality of origin stations, the IP addresses of the plurality of origin stations, and the plurality of virtual IP addresses.

In one embodiment, the IP address mapping table is determined by:

receiving information sent by a plurality of back-to-origin devices, wherein the information sent by each of the back-to-origin devices includes an IP address of each of the back-to-origin devices, the domain name information of an origin station corresponding to each of the back-to-origin devices, and the IP address of the origin station corresponding to each of the back-to-origin devices;

generating a plurality of virtual IP addresses in one-to-one correspondence with IP addresses of origin stations corresponding to the plurality of back-to-origin devices according to the IP addresses of the origin stations corresponding to the plurality of back-to-origin devices; and generating the IP address mapping table according to the IP addresses of the plurality of back-to-origin devices, the domain name information of the origin stations corresponding to the plurality of back-to-origin devices, the IP addresses of the origin stations corresponding to the plurality of back-to-origin devices, and the plurality of virtual IP addresses.

In one embodiment, the processing module is configured to parse the first data packet to obtain the data information corresponding to the first data packet in addition to the virtual IP address corresponding to the first data packet;

the processing module is further configured to process the data information to obtain processed data information before the transceiver module sends the first data packet according to the destination IP address; and the transceiver module is further configured to obtain a second data packet according to the processed data information and the destination IP address, and send the second data packet.

An edge device provided in an embodiment of the present disclosure includes:

a processing module, configured to parse a first data packet after determining that the first data packet sent by a client device is received, to obtain a destination port corresponding to the first data packet; and a transceiver module, configured to send the first data packet according to the destination port.

In one embodiment, the processing module is configured to parse the first data packet to obtain data information corresponding to the first data packet in addition to the destination port corresponding to the first data packet;

the processing module is further configured to drain the data information to a first port before the transceiver module sends the first data packet according to the destination port, and obtain the destination port corresponding to the first data packet after determining that the data information reaches the first port, wherein the first port is a port determined from one or more ports in advance and configured to receive the data information; and the transceiver module is further configured to send the first data packet according to the data information corresponding to the first data packet and the destination port.

In one embodiment, the transceiver module is further configured to:

process the data information to obtain processed data information; and obtain a second data packet according to the processed data information and the destination port, and send the second data packet.

A computer readable storage medium provided in an embodiment of the present disclosure includes an instruction which, when executed on a computer, causes the computer to perform the method described in the embodiments of the present disclosure.

A computer program product provided in an embodiment of the present disclosure which, when executed on a computer, causes the computer to perform the method described in the embodiments of the present disclosure.

These embodiments of the present disclosure may be more concise and understandable in the description of the following embodiments.

BRIEF DESCRIPTION OF THE DRAWINGS

In order to describe the technical solutions of the embodiments of the present disclosure more clearly, the accompanying drawings used in the description of the embodiments are briefly described below. It is apparent that the drawings described below are only some embodiments of the present disclosure. For those of ordinary skills in the art, other drawings may be obtained according to these drawings without any creative effort.

DETAILED DESCRIPTION

In order to make objects, technical solutions and advantages of the present disclosure clearer, embodiments of the present disclosure are explained below in detail with reference to the accompanying drawings. It is apparent that the described embodiments are only some of the embodiments of the present disclosure, rather than all of them. Based on the embodiments in the present disclosure, all other embodiments obtained by those of ordinary skills in the art without creative efforts shall fall within the protection scope of the present disclosure.

Figure 1A:
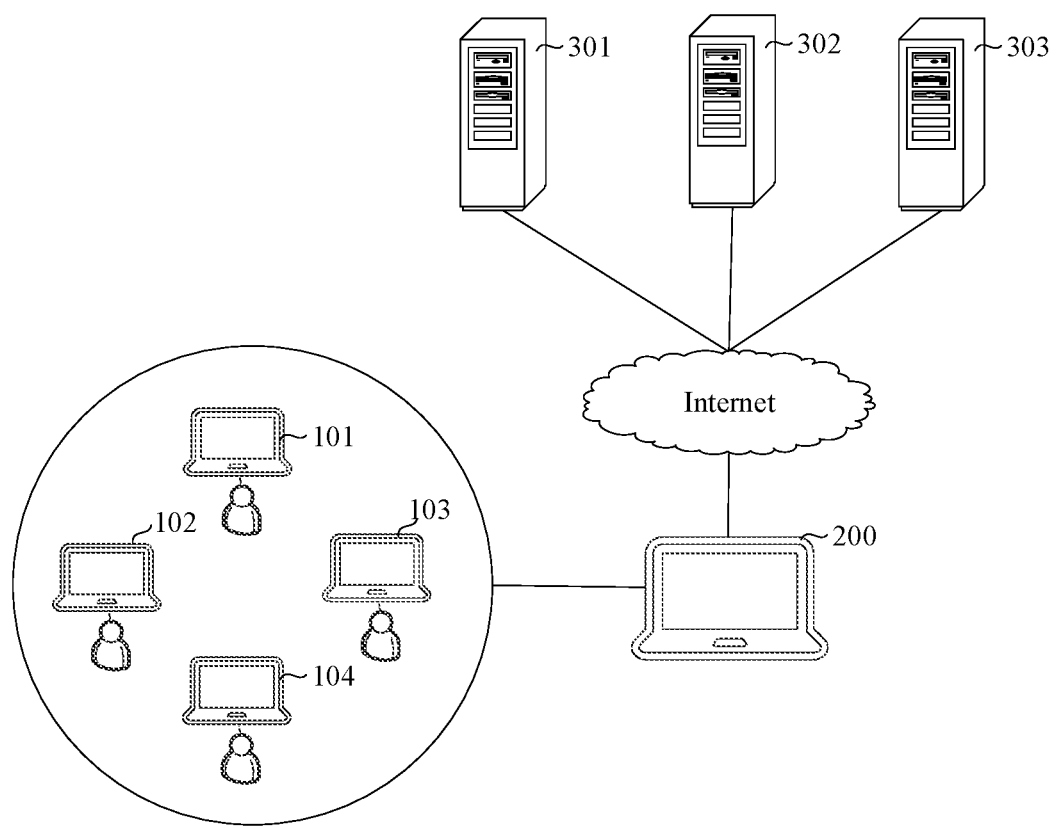
FIG. 1a is an applicable architecture diagram of a system provided in an embodiment of the present disclosure.

FIG. 1a is a schematic architecture diagram of a system applicable to an embodiment of the present disclosure. The system architecture may be used to schedule data information sent by a client device. The system architecture illustrated in FIG. 1a may have various possibilities, such as a DNS system or a content delivery network (CDN) system, which is not specifically limited.

As shown in FIG. 1a, the system architecture may include at least one client device (such as a client device 101, a client device 102, a client device 103, and a client device 104 that are illustrated in FIG. 1a), an edge device 200, and a plurality of origin stations (such as an origin station 301, an origin station 302, and an origin station 303 that are illustrated in FIG. 1a). Herein, the client devices 101 to 104 may be located in the same area, and the edge device 200 may be responsible for managing the client devices 101 to 104 located in the area. Specifically, the edge device 200 may communicate with each of the client devices in the area through an access network. For example, the edge device 200 may communicate with the client devices 101 to 104 through a wired way (a cable, an optical fiber, etc.), or may communicate with the client devices 101 to 104 through a wireless way (a Bluetooth, a wireless fidelity (WIFI), etc.).

In a specific implementation, the client device may be a terminal device, such as a mobile phone, a laptop, a desktop computer, and the like. The client device may have a plurality of functions, such as a routing function, a recording function, a consensus function, and the like. Specifically, the client device may transmit the data information or a request message to the edge device and receive information fed back by the edge device. Alternatively, the client device may record a transmission process of all the data information in history, such as time for transmitting the data information, an amount of data for transmitting the data information, and the like. Alternatively, the client device may communicate with the client devices in the same area or a different area to share the data information. In a practical application, the routing function is a function that each of at least one client device must have, and other functions may be set by those skilled in the art according to actual needs.

Taking the client device 101 sending the data information to the origin station 301 as an example, the edge device 200 may process the data information after receiving the data information sent by the client device 101 and send the processed data information to the origin station 301, thereby realizing a process of scheduling the data information. Herein, the data information may be processed in various ways. For example, if the edge device 200 detects that the data amount of the data information is relatively large, the data information may be compressed, and the speed of sending the data information may be increased by sending the compressed data information to the origin station 301. Alternatively, if the edge device 200 detects that the data information contains sensitive information, the data information may be encrypted, and the security of the data information may be improved by sending the encrypted data information to the origin station 301. This is only an exemplary description of the method for processing the data information by the edge device and not a limited use of this method. In a specific implementation, the data information may also be processed according to the actual needs, which is not specifically limited.

It should be noted that FIG. 1a is only an example of the system architecture applicable to the embodiment of the present disclosure. It may be understood that, in other possible examples, all systems that are applicable to the method for processing data provided in the embodiment of the present disclosure may be the solutions in the embodiment of the present disclosure. In one example, the system architecture may further include a plurality of edge devices, and any one of the plurality of edge devices may manage a plurality of client devices. For example, the system architecture may include a first edge device to a third edge device, the first edge device may be responsible for managing a first client device to a fourth client device located in an area A1, a second edge device may be responsible for managing a fifth client device and a sixth client device located in an area A2, and the third edge device may be responsible for managing a seventh client device to a tenth client device located in an area A3.

Figure 1B:
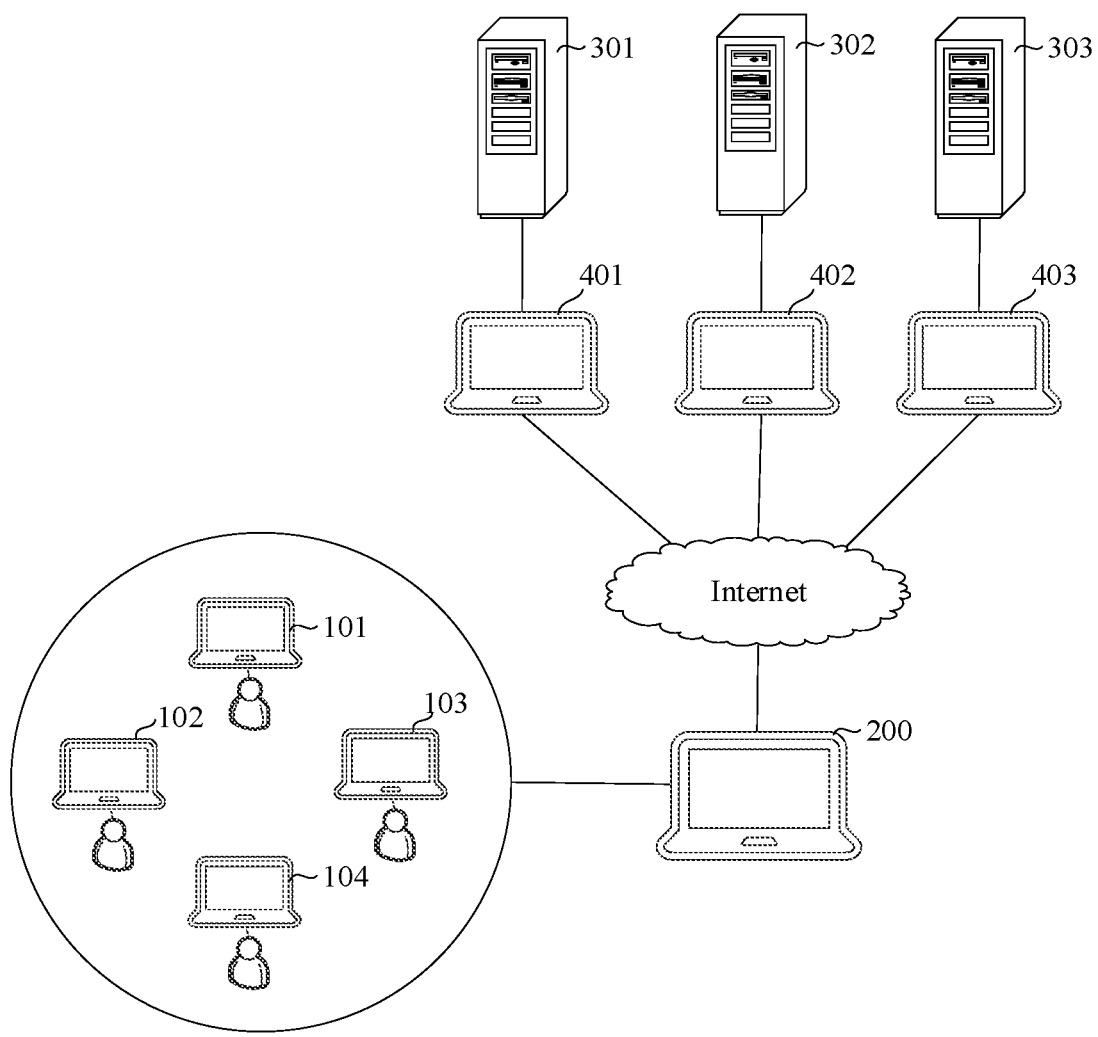
FIG. 1b is another applicable architecture diagram of a system provided in an embodiment of the present disclosure.

FIG. 1*b* is another architecture schematic diagram of a system applicable to the embodiment of the present disclosure. Compared with a method for the system architecture in FIG. 1*a*, the system architecture illustrated in FIG. 1*b* may further include at least one back-to-origin device, such as a back-to-origin device 401, a back-to-origin device 402 and a back-to-origin device 403 illustrated in FIG. 1*b*. Herein, the at least one back-to-origin device may be disposed between the edge device and the plurality of origin stations, and communication connection between the edge device, the back-to-origin device and the origin station may be realized in the wired way or the wireless way. For example, the edge device and the back-to-origin device are connected through the network cable (or the optical fiber), and the back-to-origin device and the origin station are connected through the WIFI (or the Bluetooth). Alternatively, the edge device and the back-to-origin device are connected through the WIFI (or the Bluetooth), and the back-to-origin device and the origin station are connected through the cable (or the optical fiber). Alternatively, the connection between the edge device, the back-to-origin device and the origin station are all through the cable (or the optical fiber, the WIFI, the Bluetooth), which are not specifically limited.

In a specific implementation, the at least one back-to-origin device may be disposed in various ways. In one example, each of the at least one back-to-origin device may be disposed in one-to-one correspondence with each of the origin stations. For example, as shown in FIG. 1*b*, the back-to-origin device 401 may be disposed corresponding to the origin station 301, the back-to-origin device 402 may be disposed corresponding to the origin station 302, and the back-to-origin device 403 may be disposed corresponding to the origin station 303. In another example, each of the at least one back-to-origin device may manage the plurality of origin stations located in the same area. For example, the system architecture may include a first back-to-origin device to a third back-to-origin device, the first back-to-origin device may manage a first origin station to a third origin station located in an area B1, a second back-to-origin device may manage a fourth origin station located in an area B2, and the third back-to-origin device may manage a fifth origin station to a seventh origin station located in an area B3.

Taking the ways of disposing the back-to-origin device illustrated in FIG. 1*b* as an example, an implementation process of the client device 101 sending the data information to the origin station 301 may be as follows. The edge device 200 may process the data information after receiving the data information sent by the client device 101, and send the processed data information to the back-to-origin device 401 corresponding to the origin station 301. Correspondingly, the back-to-origin device 401 may perform an inverse processing on the processed data information after receiving the processed data information, and then send the data information obtained by the inverse processing to the origin station 301. For example, if the edge device 200 compresses the data information, the back-to-origin device 401 may decompress the compressed data information. If the edge device 200 encrypts the data information, the back-to-origin device 401 may decrypt the encrypted data information. In the embodiment of the present disclosure, the back-to-origin device corresponding to the origin station may be disposed at a position close to the origin station. The back-to-origin device performs the inverse processing on the processed data information, so that the origin station may directly carry out a subsequent processing after receiving the data information without additional works such as decompression or decryption, thereby reducing the pressure of the origin station.

In an actual business scenario, the data information sent by the client device may include two types (referred to as a first type and a second type for convenience of description). Domain name information of a target origin station may be encapsulated in the first type of the data information, such as the data information based on HyperText Transfer Protocol (HTTP). The domain name information of the target origin station cannot be encapsulated in the second type of the data information, such as the data information based on Transmission Control Protocol (TCP), the data information based on User Datagram Protocol (UDP), and the like. For the first type of the data information, the client device may parse the data information after receiving the data information to obtain the domain name information of the origin station, thereby determining an IP address and a destination port of the origin station through the domain name information of the origin station. However, for the second type of data information, since the domain name information of the origin station is not encapsulated in the second type of data information, the edge device cannot obtain the IP address and the destination port of the target origin station according to the data information in a practical operation if the client device only sends the data information to the edge device, thus causing errors in the process of scheduling the data information.

In order to solve the problems described above, a plurality of virtual IP addresses and a plurality of ports are manually preset in the edge device in the existing technology, the plurality of virtual IP addresses may be in one-to-one correspondence with the plurality of origin stations, and the plurality of ports may be the same as the ports of the plurality of origin stations. In a specific implementation, the edge device may synchronize a corresponding relationship between the plurality of virtual IP addresses and the plurality of origin stations to the client device. Therefore, the client device may determine the virtual IP address corresponding to the target origin station according to the information synchronized by the edge device, thereby sending the data information to the virtual IP address corresponding to the target origin station. The edge device may determine the destination port (such as a port 5) encapsulated in the data information after receiving the data information sent by the client device, and drain the data information to the port 5 set on the edge device. It can be seen that in the existing technology, the edge device may determine the IP address and the destination port of the target origin station according to the virtual IP address and the port at which the data information arrives, so that the data information may be forwarded to the target origin station.

There may be some problems with the method in the existing technology adopted, for example, the edge device needs to be provided with the same port as that of the plurality of origin stations. If one port of the origin station is the same as an original port of the edge device, the functions performed by the original port of the edge device are discarded, thus limiting the functions of the edge device. Alternatively, the virtual IP address and the port that are set on the edge device are set according to the IP address and port of the origin station that are manually obtained. If the IP address or the port of the origin station changes at a certain moment, the virtual IP address and the port set on the edge device may not be updated in real time, thus causing errors in the process of scheduling the data information. It can be seen that the solution in the existing technology may lead to poor flexibility in scheduling the data information.

To sum up, a need exists for a method and apparatus for processing data to improve the flexibility of scheduling the data information.

The method for processing data in the embodiment of the present disclosure is described in detail below. The method for processing data may realize the process of scheduling data information between a client device and a target origin station.

In the embodiment of the present disclosure, the client device may send a first data packet to an edge device when determining to schedule data with the target origin station. The first data packet may include a virtual IP address, or a destination port, or the virtual IP address and the destination port. Correspondingly, after receiving the first data packet sent by the client device, the edge device may parse the first data packet to obtain the virtual IP address corresponding to the first data packet if the first data packet includes the virtual IP address, and perform data processing according to the virtual IP address; the edge device may parse the first data packet to obtain the destination port corresponding to the first data packet if the first data packet includes the destination port, and perform the data processing according to the destination port; and the edge device may parse the first data packet to obtain the virtual IP address and the destination port that correspond to the first data packet if the first data packet includes the virtual IP address and the destination port, and perform the data processing according to the virtual IP address and the destination port.

Three possible aspects are respectively described below. Example 1 corresponds to an aspect that the first data packet includes the virtual IP address, Example 2 corresponds to an aspect that the first data packet includes the destination port, and Example 3 corresponds to an aspect that the first data packet includes the virtual IP address and the destination port.

In Example 1, if the edge device parses the first data packet to obtain the virtual IP address corresponding to the first data packet, the edge device may query an IP address mapping table according to the virtual IP address corresponding to the first data packet to obtain the destination IP address corresponding to the virtual IP address. The edge device may send the first data packet according to the destination IP address. In the mode described in Example 1, the edge device may be provided with the IP address mapping table, and the destination IP address may be obtained by querying the IP address mapping table, so that the edge device may not need to synchronize the information of the origin station to the client device, thereby making a process of determining the destination IP address more flexible and further improving the flexibility of scheduling the data information.

It should be noted that in Example 1, when the edge device sends the first data packet, the destination port corresponding to the first data packet may be determined through the existing technology. One example of the existing technology is taken to illustrate as follows. The edge device may be manually provided with a plurality of ports before receiving the first data packet, and the plurality of ports are respectively the same as the ports of a plurality of origin stations. After the edge device receives the first data packet, the first data packet may be drained to the same port provided on the edge device as the port of a target origin station in the mode of the existing technology. At this time, the edge device determines the destination port corresponding to the first data packet by detecting the port at which the first data packet arrives (for example, if the first data packet is drained to a port 5, then the destination port is the port 5). It can be seen that in Example 1, the edge device may query the IP address mapping table to obtain the destination IP address after parsing the first data packet to obtain the virtual IP address, and determine the port at which the first data packet arrives as the destination port, so that the edge device may send the first data packet according to the destination IP address and the destination port.

In Example 2, if the edge device parses the first data packet to obtain the destination port corresponding to the first data packet, the edge device may send the first data packet according to the destination port. Herein, the destination port obtained by parsing the first data packet is the destination port of the origin station. Compared with a method for statically specifying the destination port in the existing technology, it is unnecessary for the mode in example 2 to set the destination port on the edge device, thus supporting a protocol in which a port needs a dynamical negotiation and improving the flexibility of scheduling the data information.

It should be noted that in Example 2, when the edge device sends the first data packet, the virtual IP address corresponding to the first data packet may be determined through the existing technology. One example of the existing technology is taken to illustrate as follows. Before the edge device receives the first data packet, the IP addresses of the plurality of origin stations may be manually obtained, and the plurality of virtual IP addresses may be manually set in the edge device, and the plurality of virtual IP addresses are in one-to-one correspondence with the IP addresses of the plurality of origin stations. And the edge device may send the corresponding relation to the client device, so that the client device may determine the virtual IP address corresponding to the IP address of the target origin station according to the target origin station before sending the first data packet. At this time, the client device may send the first data packet to the edge device after encapsulating the virtual IP address in the first data packet. The edge device may determine the destination IP address according to the corresponding relationship between the virtual IP address and the IP address of the origin station that are manually set.

In Example 3, if the edge device parses the first data packet to obtain the virtual IP address and the destination port that correspond to the first data packet, the edge device may send the first data packet according to the virtual IP address and the destination port that correspond to the first data packet. In Example 3, the virtual IP address and the destination port are obtained by using the edge device to parse the first data packet. On the one hand, the destination port obtained by parsing the first data packet is the destination port of the origin station. Compared with a method for statically specifying the destination port in the existing technology, it is unnecessary to set the destination port on the edge device, thus supporting the protocol in which the port needs the dynamical negotiation and improving the flexibility of scheduling the data information. On the other hand, the edge device does not need to synchronize the information of the origin station to the client device by querying the IP address mapping table to obtain the destination IP address, thus making the process of determining the destination IP address more flexible.

An implementation process of the method for processing data in the embodiment of the present disclosure is described below with Example 3 as an example. The process of determining the destination IP address in Example 1 and the process of determining the destination port in Example 2 may be implemented with reference to the method in Example 3, which may not be described again.

Figure 2:
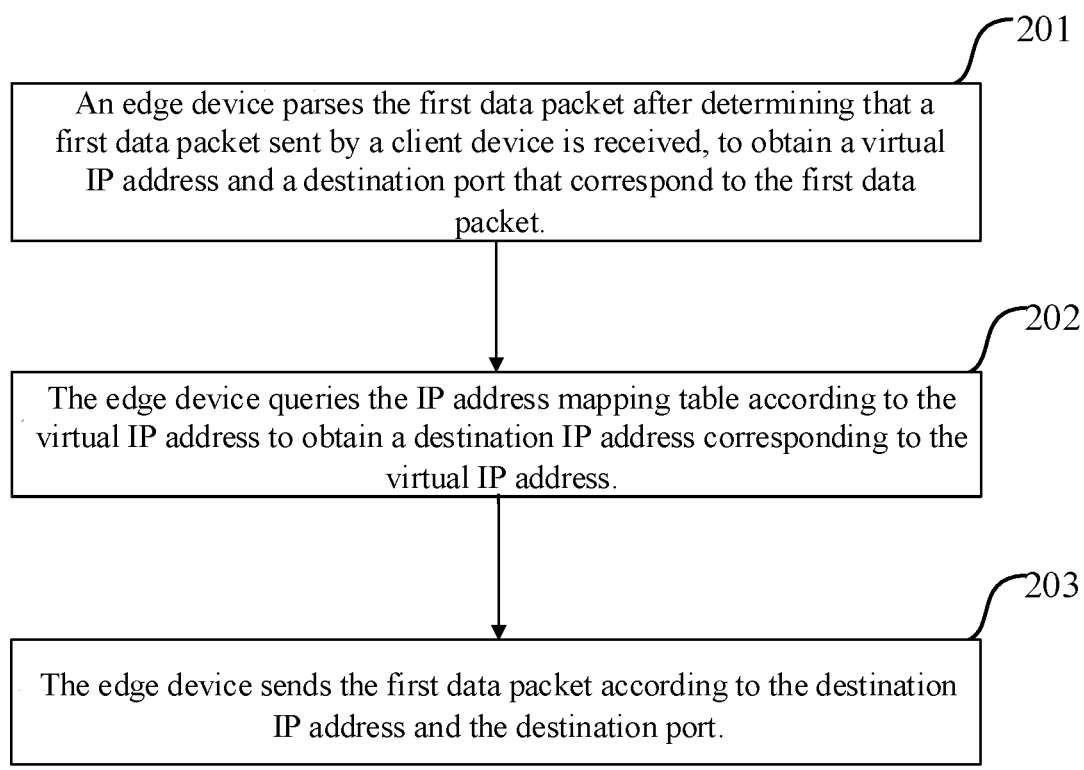
FIG. 2 is a flow diagram according to a method for processing data provided in an embodiment of the present disclosure.

FIG. 2 is a flow diagram corresponding to a method for processing data provided in an embodiment of the present disclosure. As shown in FIG. 2, the method includes the following steps. In step 201, an edge device parses a first data packet after determining that the first data packet sent by a client device is received, to obtain a virtual IP address and a destination port that correspond to the first data packet.

Here, the first data packet sent by the client device may include the virtual IP address and the destination port, and the virtual IP address may be the virtual IP address corresponding to a target origin station. Specifically, the edge device may be provided with a plurality of virtual IP addresses, and the plurality of virtual IP addresses may be in one-to-one correspondence with the IP addresses of a plurality of origin stations. The client device may determine the virtual IP address (e.g., a virtual IP address a) corresponding to the target origin station in advance before sending the first data packet to the edge device, so that the first data packet may be sent to the virtual IP address a of the edge device.

In a specific implementation, there may be a plurality of ways to obtain the virtual IP address. In one possible embodiment (referred to as Embodiment 1 for convenience of description), the virtual IP address may be determined by the client device through manual operation or determined by the client device according to a corresponding relationship, synchronized by the edge device, between the origin station and the virtual IP address. Specifically, after obtaining identification information of the plurality of origin stations (i.e., domain name information of the target origin station), a user may set the plurality of virtual IP addresses in the edge device and construct a corresponding relationship table of the plurality of virtual IP addresses and the domain name information of the plurality of origin stations, in which each of the virtual IP addresses may correspond to the domain name information of one origin station. At the same time, the edge device may synchronize the corresponding relationship table of the plurality of virtual IP addresses and the domain name information of the plurality of origin stations to the client device. After determining the target origin station, the client device may manually or automatically determine the virtual IP address corresponding to the domain name information of the target origin station from the corresponding relationship table.

In another possible embodiment (referred to as Embodiment 2 for convenience of description), the virtual IP address may be determined by the client device according to the virtual IP address sent by the edge device. Specifically, the client device may send a request message to the edge device in advance before sending the first data packet to the edge device, and the request message may include the domain name information of the target origin station. Correspondingly, the edge device may parse the request message after receiving the request message sent by the client device, to obtain the domain name information of the target origin station, and query an IP address mapping table according to the domain name information of the target origin station to obtain the virtual IP address corresponding to the domain name information of the target origin station. The edge device may send a response message to the client device, and the response message may include the virtual IP address corresponding to the domain name information of the target origin station. The client device may parse the response message after receiving the response message sent by the edge device, to obtain the virtual IP address, and send the first data packet including the virtual IP address to the edge device.

In Embodiment 2, the first data packet sent by the client device may include the virtual IP address corresponding to the IP address of the target origin station, and the virtual IP address corresponding to the IP address of the target origin station may be obtained by the client device in advance from the edge device. That is, in the embodiment of the present disclosure, the client device is communicated with the edge device to obtain the virtual IP address corresponding to the IP address of the target origin station. Compared with a method for manually determining the virtual IP address corresponding to the IP address of the target origin station in the existing technology, the edge device may not need to synchronize a corresponding relationship between the IP addresses of the plurality of origin stations and the plurality of virtual IP addresses to the client device, and may determine the virtual IP address corresponding to the IP address of the target origin station without manual interaction, thus improving the flexibility of data processing and improving user experience.

In the embodiment of the present disclosure, the edge device may store the IP address mapping table, and the IP address mapping table may be automatically generated by the edge device according to the information of the plurality of origin stations. Specifically, after receiving the information of the plurality of origin stations, the edge device may generate the plurality of virtual IP addresses according to the number of the plurality of origin stations, and the plurality of virtual IP addresses are in one-to-one correspondence with the plurality of origin stations. Herein, the information of the plurality of origin stations may be sent by the plurality of origin stations or a back-to-origin device. The information of each of the origin stations may include the IP address of the origin station, or may also include the domain name information of the origin station and/or the IP address of the back-to-origin device, which are not specifically limited. The edge device may generate the IP address mapping table according to the information of the plurality of origin stations and the plurality of virtual IP addresses.

Based on the system architecture illustrated in FIG. 1a, in one example, the IP address mapping table may be automatically generated by the edge device according to the information sent by the plurality of origin stations, and the information sent by each of the origin stations may include the domain name information of each of the origin stations and the IP address of each of the origin stations. Specifically, after receiving the domain name information of the plurality of origin stations and the IP addresses of the plurality of origin stations sent by the plurality of origin stations, the edge device may generate the plurality of virtual IP addresses in one-to-one correspondence with the IP addresses of the plurality of origin stations according to the IP addresses of the plurality of origin stations, and further generate the IP address mapping table according to the domain name information of the plurality of origin stations, the IP addresses of the plurality of origin stations, and the plurality of virtual IP addresses.

In the system architecture illustrated in FIG. 1a, the origin stations 301 to 303 may send the information of the origin stations 301 to 303 to the edge device 200 respectively. Taking the origin station 301 as an example, the origin station 301 may detect the information of the origin station 301 (the domain name information of the origin station 301 and the IP address of the origin station 301) according to a preset period or in real time. If the origin station 301 detects that the information of the origin station 301 changes, the changed information of the origin station 301 may be sent to the edge device 200. Correspondingly, the edge device 200 may be provided with a first preset table in which the information of the plurality of origin stations is stored. If the changed information of the origin station 301 sent by the origin station 301 is received, the first preset table may be updated, for example, the information of the origin station 301 stored in the first preset table may be replaced with the changed information of the origin station 301. Table 1 shows the contents of the first preset table in the edge device.

TABLE 1

Contents of the first preset table in the edge device

| Identification of the origin station | Domain name information of the origin station | IP address of the origin station |
|---|---|---|
| Origin station 301 | fileserver1.com | 192.168.10.100 |
| Origin station 302 | fileserver2.com | 192.168.20.100 |
| Origin station 303 | fileserver3.com | 192.168.30.100 |

As shown in Table 1, the domain name information of the origin station 301 is fileserver1.com and the IP address is 192.168.10.100. The domain name information of the origin station 302 is fileserver2.com and the IP address is 192.168.20.100. The domain name information of the origin station 303 is fileserver3.com and the IP address is 192.168.30.100. At this time, the edge device 200 may determine that the number of the plurality of origin stations is 3 according to the information of the plurality of origin stations obtained by parsing the first preset table. Therefore, the edge device 200 may set three virtual IP addresses in one-to-one correspondence with the IP addresses of the three origin stations in the edge device 200. For example, the virtual IP address corresponding to the IP address of the origin station 301 is set to 192.168.10.1, the virtual IP address corresponding to the IP address of the origin station 302 is set to 192.168.20.1, and the virtual IP address corresponding to the IP address of the origin station 303 is set to 192.168.30.1. The edge device 200 may generate the IP address mapping table according to the domain name information of the three origin stations, the IP addresses of the three origin stations, and three virtual IP addresses. Based on the information of the plurality of origin stations illustrated in Table 1, the IP address mapping table generated by the edge device 200 may be as shown in Table 2.

TABLE 2

IP address mapping table

| Domain name information of the origin station | IP address of the origin station | Virtual IP address |
|---|---|---|
| fileserver1.com | 192.168.10.100 | 192.168.10.1 |
| fileserver2.com | 192.168.20.100 | 192.168.20.1 |
| fileserver3.com | 192.168.30.100 | 192.168.30.1 |

Based on the system architecture illustrated in FIG. 1b, in another example, the IP address mapping table may be automatically generated by the edge device according to the information sent by the plurality of back-to-origin devices, and the information sent by each of the back-to-origin devices may include the IP address of each of the back-to-origin devices, the domain name information of the origin station corresponding to each of the back-to-origin devices, and the IP address of the origin station corresponding to each of the back-to-origin devices. Specifically, the edge device may generate the plurality of virtual IP addresses in one-to-one correspondence with the IP addresses of the origin stations corresponding to the plurality of back-to-origin devices after receiving the information sent by the plurality of back-to-origin devices, and further generate the IP address mapping table according to the IP addresses of the plurality of back-to-origin devices, the domain name information of the origin stations corresponding to the plurality of back-to-origin devices, the IP addresses of the origin stations corresponding to the plurality of back-to-origin devices, and the plurality of virtual IP addresses.

In the system architecture illustrated in FIG. 1b, the back-to-origin devices 401 to 403 may monitor the status of the origin stations 301 to 303 according to the preset period or in real time, and send the information of the origin stations 301 to 303 to the edge device 200. Taking the back-to-origin device 401 as an example, if the back-to-origin device 401 detects that the information of the origin station 301 changes, the changed information of the origin station 301 may be sent to the edge device 200. The case described here is that the IP address of the back-to-origin device 401 does not change. If the IP address of the back-to-origin device 401 changes, the back-to-origin device 401 may send both the changed IP address of the back-to-origin device 401 and the changed information of the origin station 301 to the edge device 200. Correspondingly, the edge device 200 may be provided with a second preset table in which the information of the plurality of origin stations and the IP addresses of the plurality of back-to-origin devices are stored. If the changed information of the origin station 301 and/or the changed IP address of the back-to-origin device 401 sent by the back-to-origin device 401 are received, the edge device 200 may update the second preset table, for example, replace the information of the origin station 301 stored in the second preset table with the changed information of the origin station 301, and/or replace the information of the back-to-origin device 401 stored in the second preset table with the changed information of the back-to-origin device 401. Table 3 shows the contents of the second preset table in the edge device.

TABLE 3

Contents of the second preset table in the edge device

| Identification of the origin station | Domain name information of the origin station | IP address of the origin station | Back-to-origin identification | Back-to-origin IP address |
|---|---|---|---|---|
| Origin station 301 | fileserver1.com | 192.168.10.100 | Back-to-origin device 401 | 192.168.10.10 |
| Origin station 302 | fileserver2.com | 192.168.20.100 | Back-to-origin device 402 | 192.168.20.10 |
| Origin station 303 | fileserver3.com | 192.168.30.100 | Back-to-origin device 403 | 192.168.30.10 |

As shown in Table 3, the IP address of the back-to-origin device 401 is 192.168.10.10, the origin station corresponding to the back-to-origin device 401 is the origin station 301, the domain name information of the origin station 301 is fileserver1.com, and the IP address is 192.168.10.100. The IP address of the back-to-origin device 402 is 192.168.20.10, the origin station corresponding to the back-to-origin device 402 is the origin station 302, the domain name information of the origin station 302 is fileserver2.com, and the IP address is 192.168.20.100. The IP address of the back-to-origin device 403 is 192.168.30.10, the origin station corresponding to the back-to-origin device 403 is the origin station 303, the domain name information of the origin station 303 is fileserver3.com, and the IP address is 192.168.30.100. At this time, the edge device 200 may determine that the number of the plurality of origin stations is 3 according to the information of the plurality of origin stations obtained by parsing the second preset table. Therefore, the edge device 200 may set three virtual IP addresses in one-to-one correspondence with the IP addresses of the three origin stations in the edge device 200. The edge device 200 may generate the IP address mapping table according to the IP addresses of the three back-to-origin devices, the domain name information of the three origin stations, the IP addresses of the three origin stations, and three virtual IP addresses. Based on the information of the plurality of origin stations and the IP addresses of the plurality of back-to-origin devices illustrated in Table 3, the IP address mapping table generated by the edge device 200 may be as shown in Table 4.

TABLE 4

IP address mapping table

| Domain name information of the origin station | IP address of the origin station | Back-to-origin IP address | Virtual IP address |
|---|---|---|---|
| fileserver1.com | 192.168.10.100 | 192.168.10.10 | 192.168.10.1 |
| fileserver2.com | 192.168.20.100 | 192.168.20.10 | 192.168.20.1 |
| fileserver3.com | 192.168.30.100 | 192.168.30.10 | 192.168.30.1 |

In the embodiment of the present disclosure, the edge device may receive the information of the plurality of origin stations in real time, so that the plurality of virtual IP addresses and the IP address mapping table may be automatically set, thereby having a better real-time performance and saving manpower and material resources compared with a method for manually setting the virtual IP address in the existing technology.

Taking the IP address mapping table shown in Table 2 as an example, if the domain name information of the origin station obtained by parsing the request message after the edge device receives the request message sent by the client device is fileserver2.com, the edge device may determine that the virtual IP address corresponding to fileserver2.com is 192.168.20.1 according to a corresponding relationship of the domain name information of the origin station and the virtual IP address in Table 2. At this time, the edge device may send a response message to the client device, and the response message includes the virtual IP address (i.e., 192.168.20.1). Correspondingly, the client device may send the first data packet to the edge device after receiving the response message, and the first data packet includes the data information, the virtual IP address 192.168.20.1 and a destination port. Herein, the data information may be specific business information, such as data flows, information flows, and the like.

In the embodiment of the present disclosure, the edge device may parse the first data packet after determining that the first data packet reaches the edge device, to obtain the data information, the virtual IP address and the destination port that are included in the first data packet. Herein, there may be various ways to parse the first data packet. For example, a memory program may be written in the edge device, and the memory program may drive the edge device to store the corresponding relationship of the first data packet, the destination port corresponding to the first data packet, and the virtual IP address corresponding to the first data packet. Specifically, after parsing the first data packet to obtain the data information, the virtual IP address and the destination port that are included in the first data packet, the edge device may record the virtual IP address and the destination port that correspond to the first data packet as a history message in a preset storage space of the edge device. For example, if the history message "first data packet—192.168.20.1—port 5" is stored in the preset storage space of the edge device, it may be determined that the edge device parses the first data packet, and the obtained virtual IP address corresponding to the first data packet is 192.168.20.1, and the obtained destination port is the port 5. Here, the port 5 is the destination port.

For example, the edge device may drain the data information in the first data packet to a first port, and the first port is a port determined from one or more ports and configured to receive the data information drained by the edge device. The first port may be a fixed port, such as a fixed port 12 corresponding to an FTP protocol, or may be any other ports, such as any one of the original ports of the edge device, which is not specifically limited. That is, the edge device may drain the data information in the first data packet to any port (the destination port or other ports) on the edge device. For example, the edge device is provided with ports 1 to 10, and the port 5 has been determined as the destination port. If the solution in the existing technology is adopted, the edge device needs to drain the data information to the port 5, while the edge device may drain the data information to any one of the ports 1 to 10 according to the solution in the embodiment of the present disclosure.

Taking the FTP protocol as an example, when the first data packet sent by the client device reaches the edge device, the client device and the edge device determine the destination port through real-time negotiation. If the solution in the existing technology is adopted, the destination port may not be included in a plurality of ports preset on the edge device. Therefore, the edge device cannot drain the data information to the destination port, thereby causing errors in a process of scheduling the data information. However, if the solution in the embodiment of the present disclosure is adopted, the port obtained by the edge device parsing the first data packet is the destination port after the client device and the edge device determine the destination port through the real-time negotiation. At this time, the edge device may drain the data information to any port, that is, the data information may be normally scheduled.

In the embodiment of the present disclosure, the edge device may drain the data information to the first port in one or more original ports of the edge device without setting the same ports as that of the plurality of origin stations in the edge device, thereby avoiding manually obtaining the information of the server, thus saving manpower costs and improving flexibility of scheduling the data. That is, compared with a method for statically specifying the destination port in the existing technology, it is unnecessary to set the destination port on the edge device in the solution in the embodiment of the present disclosure, thus supporting the protocol in which the port needs the dynamic negotiation and improving the flexibility of scheduling the data information.

In step 202, the edge device queries the IP address mapping table according to the virtual IP address to obtain a destination IP address corresponding to the virtual IP address.

In the embodiment of the present disclosure, after determining that the data information corresponding to the first data packet reaches the first port, the edge device may query the history message stored in the preset storage space of the edge device to obtain the virtual IP address corresponding to the first data packet. The edge device may query the IP address mapping table according to the virtual IP address to obtain the destination IP address corresponding to the virtual IP address. If it is the system architecture illustrated in FIG. 1*a*, the destination IP address may be the IP address of the target origin station. If it is the system architecture illustrated in FIG. 1*b*, the destination IP address may be the IP address of the back-to-origin device corresponding to the target origin station.

In one possible embodiment, the edge device may be provided with at least one agent module, and each of the at least one agent module may monitor the status of one port. If the agent module monitoring a certain port detects an arrival of the data information on the port, the agent module monitoring the port may perform the contents shown in step 202. Specifically, the edge device may be provided with the ports 1 to 10. If the first port is the port 1, the edge device may be provided with only a first agent module monitoring the port 1, or may be provided with the first agent module monitoring the port 1 and a second to a tenth agent modules monitoring the ports 2 to 10, which is not specifically limited.

Taking the first agent module monitoring the first port as an example, if the first agent module detects that the data information corresponding to the first data packet reaches the first port, the history message corresponding to the first data packet may be obtained from the preset storage space of the edge device. If the obtained history message is "first packet—192.168.20.1—port 5", the first agent module may determine that the virtual IP address corresponding to the first packet is 192.168.20.1 and the destination port is the port 5. After determining the virtual IP address 192.168.20.1 corresponding to the first data packet, the first agent module may query the IP address mapping table to obtain the destination IP address corresponding to the virtual IP address 192.168.20.1. If it is the system architecture illustrated in FIG. 1*a*, the first agent module may query the IP address mapping table illustrated in Table 2. At this time, the first agent module may determine that the destination IP address corresponding to the virtual IP address 192.168.20.1 is the IP address 192.168.20.100 of the origin station. If it is the system architecture illustrated in FIG. 1*b*, the first agent module may query the IP address mapping table illustrated in Table 4. At this time, the first agent module may determine that the destination IP address corresponding to the virtual IP address 192.168.20.1 is the IP address 192.168.20.10 of the back-to-origin device.

In step 203, the edge device sends the first data packet according to the destination IP address and the destination port.

In one possible embodiment, the edge device may also obtain the data information corresponding to the first data packet by parsing the first data packet. Correspondingly, the edge device may obtain a second data packet (i.e. the processed first data packet) according to the data information, the destination IP address and the destination port that correspond to the first data packet, and send the second data packet. Specifically, the edge device may process the data information corresponding to the first data packet before obtaining the second data packet, to obtain the processed data information. The edge device may encapsulate to obtain the second data packet according to the processed data information, the destination IP address and the destination port. Herein, there may be various ways to process the data information, such as compression processing, acceleration processing, encryption processing, and the like, which are not specifically limited.

In one example, if it is the system architecture illustrated in FIG. 1*a*, it may be determined that the obtained destination IP address is the IP address of the origin station, and at this time, the edge device may send the second data packet to the target origin station. In another example, if it is the system architecture illustrated in FIG. 1*b*, it may be determined that the obtained destination IP address is the IP address of the back-to-origin device, and at this time, the edge device may send the second data packet to the back-to-origin device. Correspondingly, after receiving the second data packet, the back-to-origin device may obtain a third data packet according to the second data information, the IP address of the origin station corresponding to the back-to-origin device and the destination port, and send the third data packet. For example, if the edge device sends the second data packet to the back-to-origin device 402, the back-to-origin device 402 may perform a secondary processing on the data information in the second data packet in the case that the data information in the second data packet is the data information processed by the edge device after receiving the second data packet. For convenience of description, the data information in the first data packet is referred to as first data information and the data information in the second data packet is referred to as second data information. If the second data information is obtained by compressing and/or encrypting the first data information by the edge device, the back-to-origin device 402 may decompress and/or decrypt the second data information to obtain third data information. The back-to-origin device 402 may obtain the third data packet according to the third data information, the IP address of the origin station 302 corresponding to the back-to-origin device 402 and the destination port, and send the third data packet to the origin station.

In the above embodiment of the present disclosure, the edge device parses the first data packet after determining that the first data packet sent by the client device is received, to obtain the virtual IP address and the destination port that correspond to the first data packet. The edge device may query the IP address mapping table according to the virtual IP address to obtain the destination IP address corresponding to the virtual IP address. The edge device sends the first data packet according to the destination IP address and the destination port. In the embodiment of the present disclosure, the virtual IP address and the destination port are obtained by using the edge device to parse the first data packet. On the one hand, the destination port obtained by parsing the first data packet is the destination port of the origin station. Compared with a method for statically specifying the destination port in the existing technology, it is unnecessary to set the destination port on the edge device, thus supporting the protocol in which the port needs the dynamical negotiation and improving the flexibility of scheduling the data information. On the other hand, the edge device does not need to synchronize the information of the origin station to the client device by querying the IP address mapping table to obtain the destination IP address, thus making the process of determining the destination IP address more flexible.

A method for processing data in an embodiment of the present disclosure is described below from the perspective of system interaction, which corresponds to the method process illustrated in FIG. 2.

Figure 3:
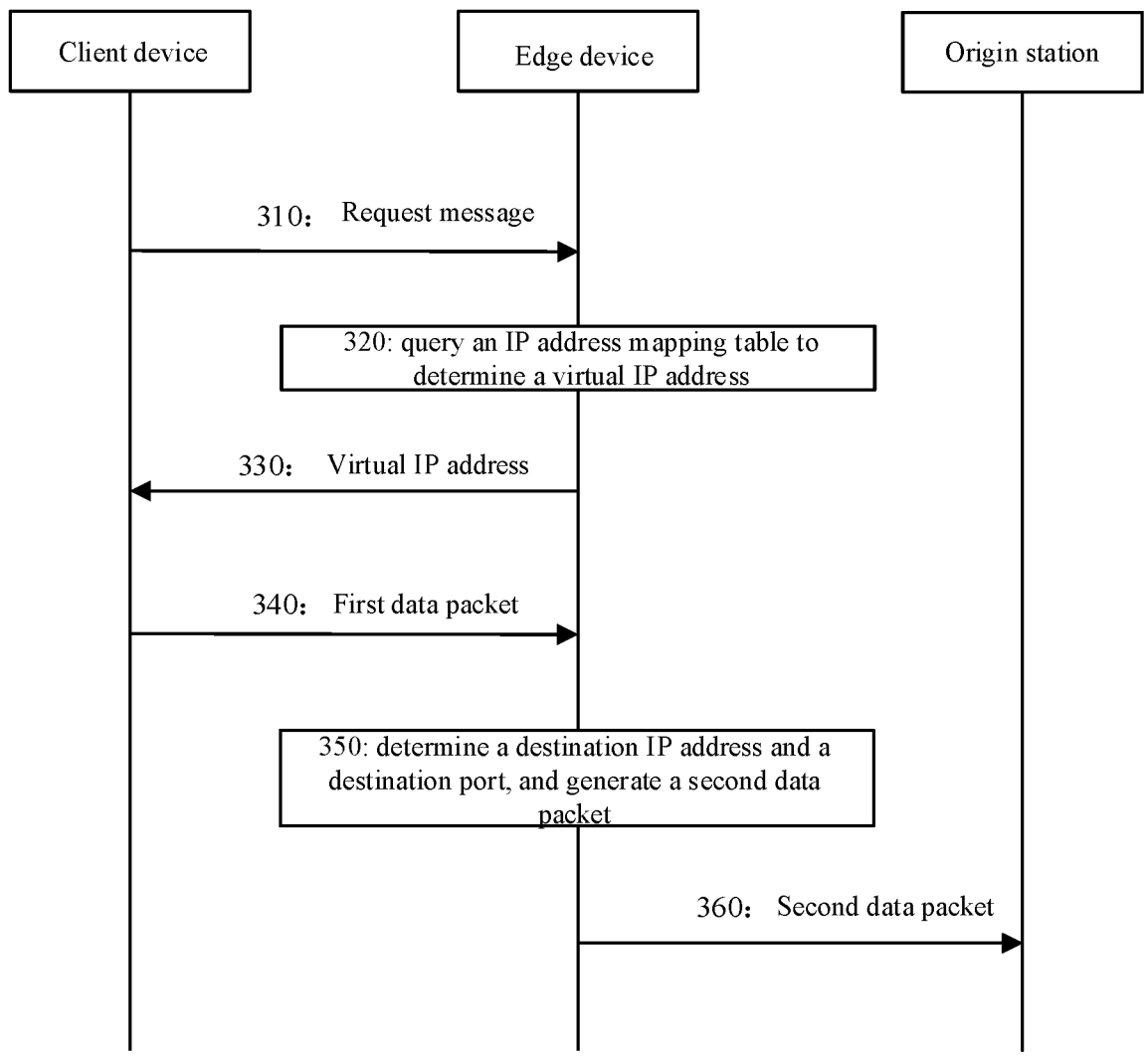
FIG. 3 is an interaction diagram according to a method for processing data provided in an embodiment of the present disclosure.

Based on the system architecture illustrated in FIG. 1a, FIG. 3 is an interaction diagram corresponding to the method for processing data provided in the embodiment of the present disclosure. The method includes the following steps.

In step 310, a client device sends a request message to an edge device, and the request message includes domain name information of a target origin station.

In step 320, the edge device queries an IP address mapping table according to the request message sent by the client device to determine a virtual IP address corresponding to the target origin station.

In step 330, the edge device sends the virtual IP address corresponding to the target origin station to the client device.

In step 340, the client device sends a first data packet to the edge device after receiving the virtual IP address corresponding to the target origin station, and the first data packet includes the virtual IP address corresponding to the target origin station and a destination port.

In step 350, the edge device parses the first data packet after determining that the first data packet sent by the client device is received, to obtain data information, the virtual IP address, and the destination port that correspond to the first data packet, and queries the IP address mapping table according to the virtual IP address corresponding to the first data packet to determine a destination IP address.

Here, the destination IP address is the IP address of the target origin station.

In step 360, the edge device generates a second data packet according to the data information, the destination IP address and the destination port that correspond to the first data packet, and sends the second data packet to the target origin station.

Herein, the process of determining the destination IP address and the destination port in steps 310 to 360 may be implemented with reference to the execution process shown in FIG. 2, which is not described in detail.

Figure 4:
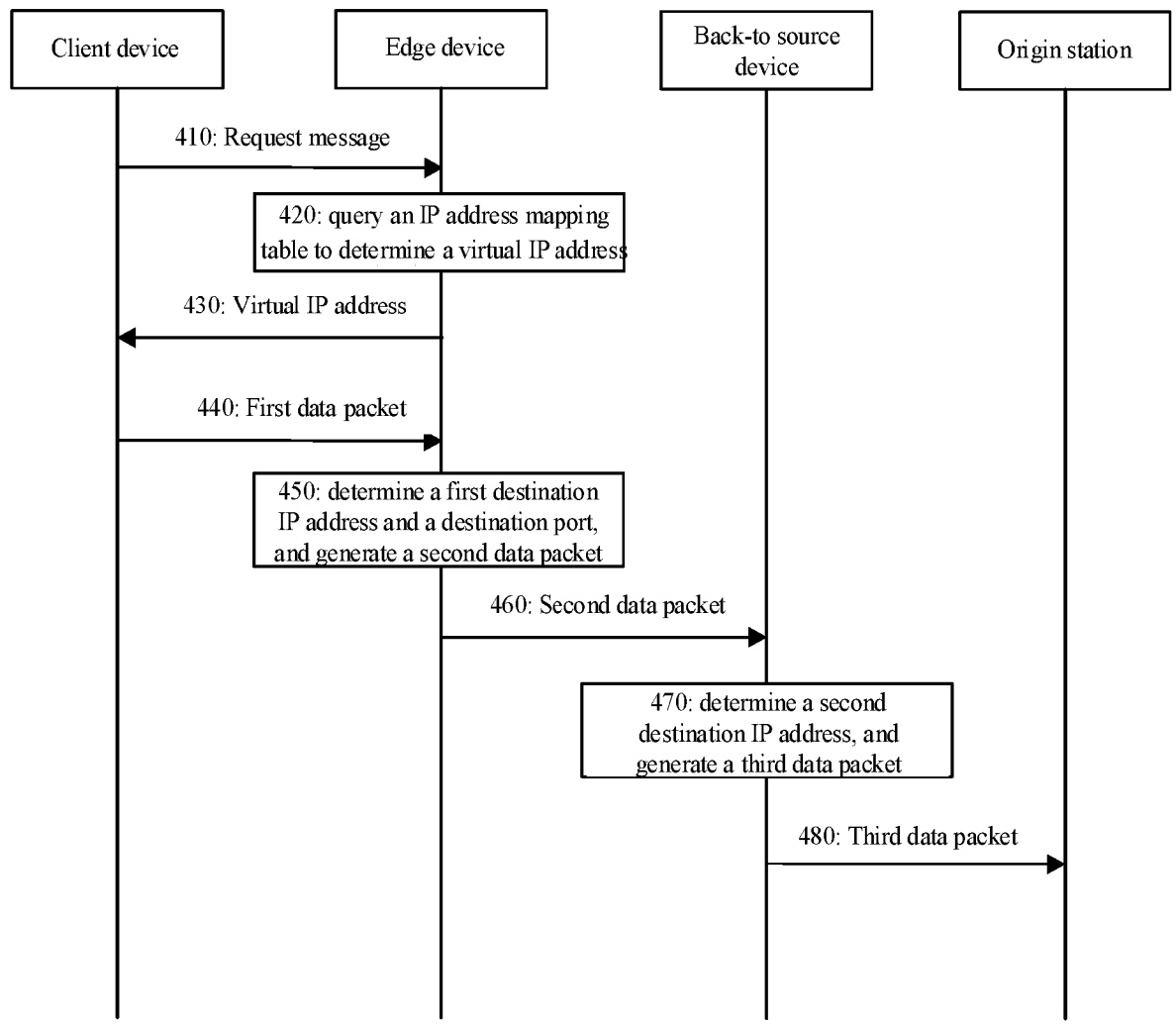
FIG. 4 is an interaction diagram according to another method for processing data provided in an embodiment of the present disclosure.

Based on the system architecture illustrated in FIG. 1b, FIG. 4 is an interaction diagram corresponding to a method for processing data provided in an embodiment of the present disclosure. The method includes the following steps.

In step 410, a client device sends a request message to an edge device, and the request message includes domain name information of a target origin station.

In step 420, the edge device queries an IP address mapping table according to the request message sent by the client device to determine a virtual IP address corresponding to the target origin station.

In step 430, the edge device sends the virtual IP address corresponding to the target origin station to the client device.

In step 440, the client device sends a first data packet to the edge device after receiving the virtual IP address corresponding to the target origin station, and the first data packet includes the virtual IP address corresponding to the target origin station and a destination port.

In step 450, the edge device parses the first data packet after determining that the first data packet sent by the client device is received, to obtain data information, the virtual IP address, and the destination port that correspond to the first data packet, and queries the IP address mapping table according to the virtual IP address corresponding to the first data packet to determine a first destination IP address.

Here, the first destination IP address may the IP address of a back-to-origin device corresponding to the target origin station.

In step 460, the edge device generates a second data packet according to the data information, the destination IP address and the destination port that correspond to the first data packet, and sends the second data packet to the back-to-origin device corresponding to the target origin station.

In step 470, the back-to-origin device corresponding to the target origin station determines a second destination IP address according to the first destination IP address corresponding to the second data packet.

Here, the second destination IP address may be the IP address of the target origin station.

In step 480, the back-to-origin device corresponding to the target origin station generates a third data packet according to the data information, the second destination IP address and the destination port that correspond to the second data packet, and sends the third data packet to the target origin station.

Herein, steps 410 to 480 may be implemented with reference to the execution process shown in FIG. 2, which are not described in detail.

In the embodiment of the present disclosure, there may be two communication processes between the client device and the edge device. In the first communication, the client device may obtain the virtual IP address fed back by the edge device, and in the second communication, the client device may send the first data packet to the target origin station through the edge device. In the embodiment of the present disclosure, the virtual IP address and the destination port are obtained by using the edge device to parse the first data packet. On the one hand, the destination port obtained by parsing the first data packet is the destination port of the origin station. Compared with a method for statically specifying the destination port in the existing technology, it is unnecessary to set the destination port on the edge device, thus supporting the protocol in which the port needs the dynamical negotiation and improving the flexibility of scheduling the data information. On the other hand, the edge device does not need to synchronize the information of the origin station to the client device by querying the IP address mapping table to obtain the destination IP address, thus making the process of determining the destination IP address more flexible.

With regard to the above method process, an edge device is further provided in an embodiments of the present disclosure, and the specific contents of the edge device may be implemented with reference to the above method.

Figure 5:
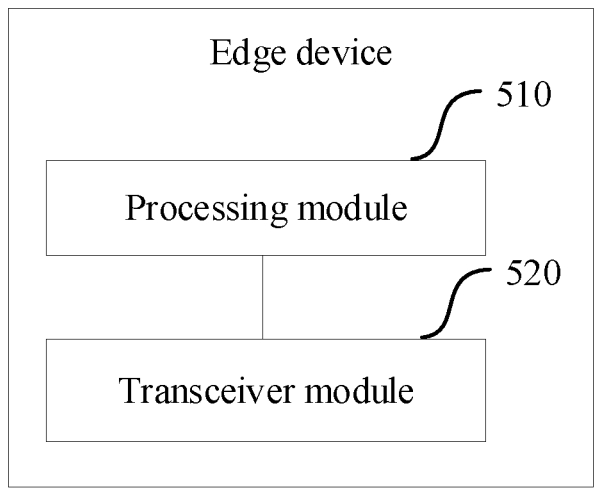
FIG. 5 is a schematic structural diagram according to an edge device provided in an embodiment of the present disclosure.

FIG. 5 is an edge device provided by an embodiment of the present disclosure. The edge device includes:

a processing module 510, configured to parse a first data packet after determining that the first data packet sent by a client device is received, to obtain a virtual IP address corresponding to the first data packet, and query an IP address mapping table according to the virtual IP address to obtain a destination IP address corresponding to the virtual IP address; and a transceiver module 520, configured to send the first data packet according to the destination IP address.

In one embodiment, the IP address mapping table is determined by:

receiving IP addresses of a plurality of origin stations sent by the plurality of origin stations, and generating a plurality of virtual IP addresses in one-to-one correspondence with the IP addresses of the plurality of origin stations according to the IP addresses of the plurality of origin stations; and generating the IP address mapping table according to the IP addresses of the plurality of origin stations and the plurality of virtual IP addresses.

In one embodiment, the IP address mapping table is determined by:

receiving information sent by a plurality of back-to-origin devices, wherein the information sent by each of the back-to-origin devices includes an IP address of each of the back-to-origin devices and the IP address of an origin station corresponding to each of the back-to-origin devices;

generating a plurality of virtual IP addresses in one-to-one correspondence with IP addresses of origin stations corresponding to the plurality of back-to-origin devices according to the IP addresses of the origin stations corresponding to the plurality of back-to-origin devices; and generating the IP address mapping table according to the IP addresses of the plurality of back-to-origin devices, the IP addresses of the origin stations corresponding to the plurality of back-to-origin devices, and the plurality of virtual IP addresses.

In one embodiment, the processing module 510 is further configured to:

receive a request message sent by the client device, wherein the request message includes domain name information of a target origin station; and query the IP address mapping table according to the domain name information of the target origin station to obtain the virtual IP address corresponding to the domain name information, and send the virtual IP address to the client device.

In one embodiment, the IP address mapping table is determined by:

receiving the domain name information of a plurality of origin stations and IP addresses of the plurality of origin stations sent by the plurality of origin stations, and generating a plurality of virtual IP addresses in one-to-one correspondence with the IP addresses of the plurality of origin stations according to the IP addresses of the plurality of origin stations; and generating the IP address mapping table according to the domain name information of the plurality of origin stations, the IP addresses of the plurality of origin stations, and the plurality of virtual IP addresses.

In one embodiment, the IP address mapping table is determined by:

receiving information sent by a plurality of back-to-origin devices, wherein the information sent by each of the back-to-origin devices includes an IP address of each of the back-to-origin devices, the domain name information of an origin station corresponding to each of the back-to-origin devices, and the IP address of the origin station corresponding to each of the back-to-origin devices;

generating a plurality of virtual IP addresses in one-to-one correspondence with IP addresses of origin stations corresponding to the plurality of back-to-origin devices according to the IP addresses of the origin stations corresponding to the plurality of back-to-origin devices; and generating the IP address mapping table according to the IP addresses of the plurality of back-to-origin devices, the domain name information of the origin stations corresponding to the plurality of back-to-origin devices, the IP addresses of the origin stations corresponding to the plurality of back-to-origin devices, and the plurality of virtual IP addresses.

In one embodiment, the processing module 510 is configured to parse the first data packet to obtain the data information corresponding to the first data packet in addition to the virtual IP address corresponding to the first data packet;

the processing module 510 is further configured to process the data information to obtain processed data information before the transceiver module 520 sends the first data packet according to the destination IP address; and the transceiver module 520 is further configured to obtain a second data packet according to the processed data information and the destination IP address, and send the second data packet.

Figure 6:
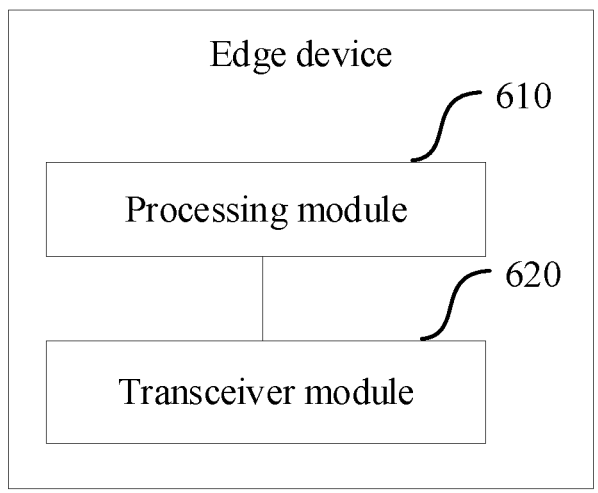
FIG. 6 is another schematic structural diagram according to an edge device provided in the embodiment of the present disclosure.

FIG. 6 is an edge device provided in an embodiment of the present disclosure. The edge device includes:

a processing module 610, configured to parse a first data packet after determining that the first data packet sent by a client device is received, to obtain a destination port corresponding to the first data packet; and a transceiver module 620, configured to send the first data packet according to the destination port.

In one embodiment, the processing module 610 is configured to parse the first data packet to obtain data information corresponding to the first data packet in addition to the destination port corresponding to the first data packet;

the processing module 610 is further configured to drain the data information to a first port before the transceiver module 620 sends the first data packet according to the destination port, and obtain the destination port corresponding to the first data packet after determining that the data information reaches the first port, where the first port is a port determined from one or more ports in advance and configured to receive the data information; and the transceiver module 620 is further configured to send the first data packet according to the data information corresponding to the first data packet and the destination port.

In one embodiment, the transceiver module 620 is further configured to:

process the data information to obtain processed data information; and obtain a second data packet according to the processed data information and the destination port, and send the second data packet.

It may be known from the above that in the above embodiments of the present disclosure, the edge device parses the first data packet after determining that the first data packet sent by the client device is received, to obtain the virtual IP address and the destination port that correspond to the first data packet. The edge device may query the IP address mapping table according to the virtual IP address to obtain the destination IP address corresponding to the virtual IP address. The edge device sends the first data packet according to the destination IP address and the destination port. In the embodiment of the present disclosure, the virtual IP address and the destination port are obtained by using the edge device to parse the first data packet. On the one hand, the destination port obtained by parsing the first data packet is the destination port of the origin station. Compared with a method for statically specifying the destination port in the existing technology, it is unnecessary to set the destination port on the edge device in the embodiment of the present disclosure, thus supporting the protocol in which the port needs the dynamical negotiation and improving the flexibility of scheduling the data information. On the other hand, by querying the IP address mapping table to obtain the destination IP address, the edge device does not need to synchronize the information of the origin station to the client device, thus making a process of determining the destination IP address more flexible.

Those skilled in the art may appreciate that the embodiments of the present disclosure may be provided as a method or a computer program product. Therefore, the present disclosure may take the form of an entirely hardware embodiment, an entirely software embodiment, or an embodiment combining software and hardware. Furthermore, the present disclosure may take the form of a computer program product implemented on one or more computer-usable storage media (including but not limited to a disk storage, a CD-ROM, an optical storage, etc.) containing a computer-usable program code therein.

The present disclosure is described with reference to flowcharts and/or block diagrams of the method, apparatus (system), and computer program product according to the embodiments of the present disclosure. It should be appreciated that each flow and/or block in the flowcharts and/or block diagrams and a combination of the flow and/or the block in the flowcharts and/or block diagrams may be implemented via computer program instructions. These computer program instructions may be provided to a processor of a general-purpose computer, special-purpose computer, embedded processor, or other programmable data processing devices to produce a machine, so that the instructions executed by the processor of the computer or the other programmable data processing devices may produce an apparatus for implementing functions specified in one or more flows in the flowcharts and/or one or more blocks in the block diagrams.

These computer program instructions may also be stored in a computer-readable memory capable of directing the computer or the other programmable data processing devices to work in a specific mode, so that the instructions stored in the computer-readable memory may produce a manufacture including an instruction device, and the instruction device may implement the functions specified in one or more flows in the flowcharts and/or one or more blocks in the block diagrams.

These computer program instructions may also be loaded onto the computer or the other programmable data processing devices, so that a series of operational steps may be performed on the computer or the other programmable devices to produce a computer-implemented processing, such that the instructions executed on the computer or the other programmable devices may provide steps for implementing the functions specified in one or more flows in the flowcharts and/or one or more blocks in the block diagrams.

Although some of the embodiments of the present disclosure have been described, other changes and modifications may be made by those skilled in the art to these embodiments once they have known the basic inventive concepts. Therefore, the appended claims are intended to be interpreted as including the some of the embodiments described above and all changes and modifications that fall within the scope of the present disclosure.

It is obvious that various modifications and variations may be made to the present disclosure by those skilled in the art without departing from the spirit and scope of the present disclosure. Thus, if these modifications and variations of the present disclosure fall within the scope of the claims of the present disclosure and their equivalent technologies, the present disclosure also intends to include these modifications and variations.

What is claimed is:

1. A method for processing data, comprising:
   parsing, by an edge device, a first data packet after determining that the first data packet sent by a client device is received, to obtain data information and a virtual IP address corresponding to the first data packet;
   recording, by the edge device, the virtual IP address as a history message in a preset storage space of the edge device;
   processing, by the edge device, the data information to obtain processed data information, and draining the processed data information to a port on the edge device;
   acquiring, by the edge device, the virtual IP address from the history message after determining that the processed data information reaches the port on the edge device, and querying an IP address mapping table according to the virtual IP address to obtain a destination IP address corresponding to the virtual IP address;
   obtaining a processed first data packet according to the processed data information and the destination IP address; and
   sending, by the edge device, the processed first data packet through the port according to the destination IP address.

2. The method according to claim 1, wherein the IP address mapping table is determined by:
   receiving, by the edge device, IP addresses of a plurality of origin stations sent by the plurality of origin stations, and generating, by the edge device, a plurality of virtual IP addresses in one-to-one correspondence with the IP addresses of the plurality of origin stations according to the IP addresses of the plurality of origin stations; and
   generating, by the edge device, the IP address mapping table according to the IP addresses of the plurality of origin stations and the plurality of virtual IP addresses.

3. The method according to claim 2, further comprising:
   updating, by the edge device, the IP address mapping table in response to receiving information sent by one of the plurality of origin stations indicating that either or both of domain name information and IP address of the one of the plurality of origin stations has been changed.

4. The method according to claim 1, wherein the IP address mapping table is determined by:
   receiving, by the edge device, information sent by a plurality of back-to-origin devices, wherein the information sent by each of the back-to-origin devices comprises an IP address of each of the back-to-origin devices and the IP address of an origin station corresponding to each of the back-to-origin devices;
   generating, by the edge device, a plurality of virtual IP addresses in one-to-one correspondence with IP addresses of origin stations corresponding to the plurality of back-to-origin devices according to the IP addresses of the origin stations corresponding to the plurality of back-to-origin devices; and
   generating, by the edge device, the IP address mapping table according to the IP addresses of the plurality of back-to-origin devices, the IP addresses of the origin stations corresponding to the plurality of back-to-origin devices, and the plurality of virtual IP addresses.

5. The method according to claim 4, further comprising:
   updating, by the edge device, the IP address mapping table in response to receiving information sent by one of the plurality of back-to-origin devices indicating that at least one of an IP address of an origin station corresponding to the one of the plurality of back-to-origin devices and an IP address of the one of the plurality of back-to-origin devices has been changed.

6. The method according to claim 1, wherein before the edge device receives the first data packet sent by the client device, the method further comprises:
   receiving, by the edge device, a request message sent by the client device, wherein the request message comprises domain name information of a target origin station; and
   querying, by the edge device, the IP address mapping table according to the domain name information of the target origin station to obtain the virtual IP address corresponding to the domain name information, and sending, by the edge device, the virtual IP address to the client device.

7. The method according to claim 6, wherein the IP address mapping table is determined by:
   receiving, by the edge device, the domain name information of a plurality of origin stations and IP addresses of the plurality of origin stations sent by the plurality of origin stations, and generating, by the edge device, a plurality of virtual IP addresses in one-to-one correspondence with the IP addresses of the plurality of origin stations according to the IP addresses of the plurality of origin stations; and
   generating, by the edge device, the IP address mapping table according to the domain name information of the plurality of origin stations, the IP addresses of the plurality of origin stations, and the plurality of virtual IP addresses.

8. The method according to claim 6, wherein the IP address mapping table is determined by:
   receiving, by the edge device, information sent by a plurality of back-to-origin devices, wherein the information sent by each of the back-to-origin devices comprises an IP address of each of the back-to-origin devices, the domain name information of an origin station corresponding to each of the back-to-origin devices and the IP address of the origin station corresponding to each of the back-to-origin devices;
   generating, by the edge device, a plurality of virtual IP addresses in one-to-one correspondence with IP addresses of origin stations corresponding to the plurality of back-to-origin devices according to the IP addresses of the origin stations corresponding to the plurality of back-to-origin devices; and
   generating, by the edge device, the IP address mapping table according to the IP addresses of the plurality of back-to-origin devices, the domain name information of the origin stations corresponding to the plurality of back-to-origin devices, the IP addresses of the origin stations corresponding to the plurality of back-to-origin devices, and the plurality of virtual IP addresses.

9. A method for processing data, comprising:
   parsing, by an edge device, a first data packet after determining that the first data packet sent by a client device is received, to obtain data information and a destination port of an origin station;
   draining, by the edge device, the data information to a first port on the edge device, wherein the first port on the edge device is any one of a set of ports on the edge device;
   obtaining, by the edge device, the destination port of the origin station after determining that the data information reaches the first port; and
   sending, by the edge device, the first data packet through the first port on the edge device to the destination port of the origin station.

10. The method according to claim 9, wherein draining the data information to a first port on the edge device comprises:
    processing, by the edge device, the data information to obtain processed data information, and draining the processed data information to the first port on the edge device; and
    wherein sending, by the edge device, the first data packet through the first port on the edge device to the destination port of the origin station comprises:
    obtaining, by the edge device, a processed first data packet according to the processed data information and the destination port of the origin station, and sending, by the edge device, the processed first data packet through the first port on the edge device to the destination port of the origin station.

11. A non-transitory computer readable storage medium comprising an instruction which, when executed on a computer, causes the computer to perform a method for processing data; wherein the method comprises:
    parsing, by an edge device, a first data packet after determining that the first data packet sent by a client device is received, to obtain data information and a virtual IP address corresponding to the first data packet;
    recording, by the edge device, the virtual IP address as a history message in a preset storage space of the edge device;
    processing, by the edge device, the data information to obtain processed data information, and draining the processed data information to a port on the edge device;
    acquiring, by the edge device, the virtual IP address from the history message after determining that the processed data information reaches the port on the edge device, and querying an IP address mapping table according to the virtual IP address to obtain a destination IP address corresponding to the virtual IP address;

obtaining a processed first data packet according to the processed data information and the destination IP address; and sending, by the edge device, the processed first data packet through the port according to the destination IP address.

12. The non-transitory computer readable storage medium according to claim 11, wherein the IP address mapping table is determined by:

receiving, by the edge device, IP addresses of a plurality of origin stations sent by the plurality of origin stations, and generating, by the edge device, a plurality of virtual IP addresses in one-to-one correspondence with the IP addresses of the plurality of origin stations according to the IP addresses of the plurality of origin stations; and generating, by the edge device, the IP address mapping table according to the IP addresses of the plurality of origin stations and the plurality of virtual IP addresses.

13. The non-transitory computer readable storage medium according to claim 11, wherein the IP address mapping table is determined by:

receiving, by the edge device, information sent by a plurality of back-to-origin devices, wherein the information sent by each of the back-to-origin devices comprises an IP address of each of the back-to-origin devices and the IP address of an origin station corresponding to each of the back-to-origin devices;

generating, by the edge device, a plurality of virtual IP addresses in one-to-one correspondence with IP addresses of origin stations corresponding to the plurality of back-to-origin devices according to the IP addresses of the origin stations corresponding to the plurality of back-to-origin devices; and generating, by the edge device, the IP address mapping table according to the IP addresses of the plurality of back-to-origin devices, the IP addresses of the origin stations corresponding to the plurality of back-to-origin devices, and the plurality of virtual IP addresses.

14. The non-transitory computer readable storage medium according to claim 11, wherein the IP address mapping table is determined by:

wherein before the edge device receives the first data packet sent by the client device, the method further comprises:

receiving, by the edge device, a request message sent by the client device, wherein the request message comprises domain name information of a target origin station; and querying, by the edge device, the IP address mapping table according to the domain name information of the target origin station to obtain the virtual IP address corresponding to the domain name information, and sending, by the edge device, the virtual IP address to the client device.

15. The non-transitory computer readable storage medium according to claim 14, wherein the IP address mapping table is determined by:

receiving, by the edge device, the domain name information of a plurality of origin stations and IP addresses of the plurality of origin stations sent by the plurality of origin stations, and generating, by the edge device, a plurality of virtual IP addresses in one-to-one correspondence with the IP addresses of the plurality of origin stations according to the IP addresses of the plurality of origin stations; and generating, by the edge device, the IP address mapping table according to the domain name information of the plurality of origin stations, the IP addresses of the plurality of origin stations, and the plurality of virtual IP addresses.

16. The non-transitory computer readable storage medium according to claim 14, wherein the IP address mapping table is determined by:

receiving, by the edge device, information sent by a plurality of back-to-origin devices, wherein the information sent by each of the back-to-origin devices comprises an IP address of each of the back-to-origin devices, the domain name information of an origin station corresponding to each of the back-to-origin devices and the IP address of the origin station corresponding to each of the back-to-origin devices;

generating, by the edge device, a plurality of virtual IP addresses in one-to-one correspondence with IP addresses of origin stations corresponding to the plurality of back-to-origin devices according to the IP addresses of the origin stations corresponding to the plurality of back-to-origin devices; and generating, by the edge device, the IP address mapping table according to the IP addresses of the plurality of back-to-origin devices, the domain name information of the origin stations corresponding to the plurality of back-to-origin devices, the IP addresses of the origin stations corresponding to the plurality of back-to-origin devices, and the plurality of virtual IP addresses.

* * * * *